3,479,450

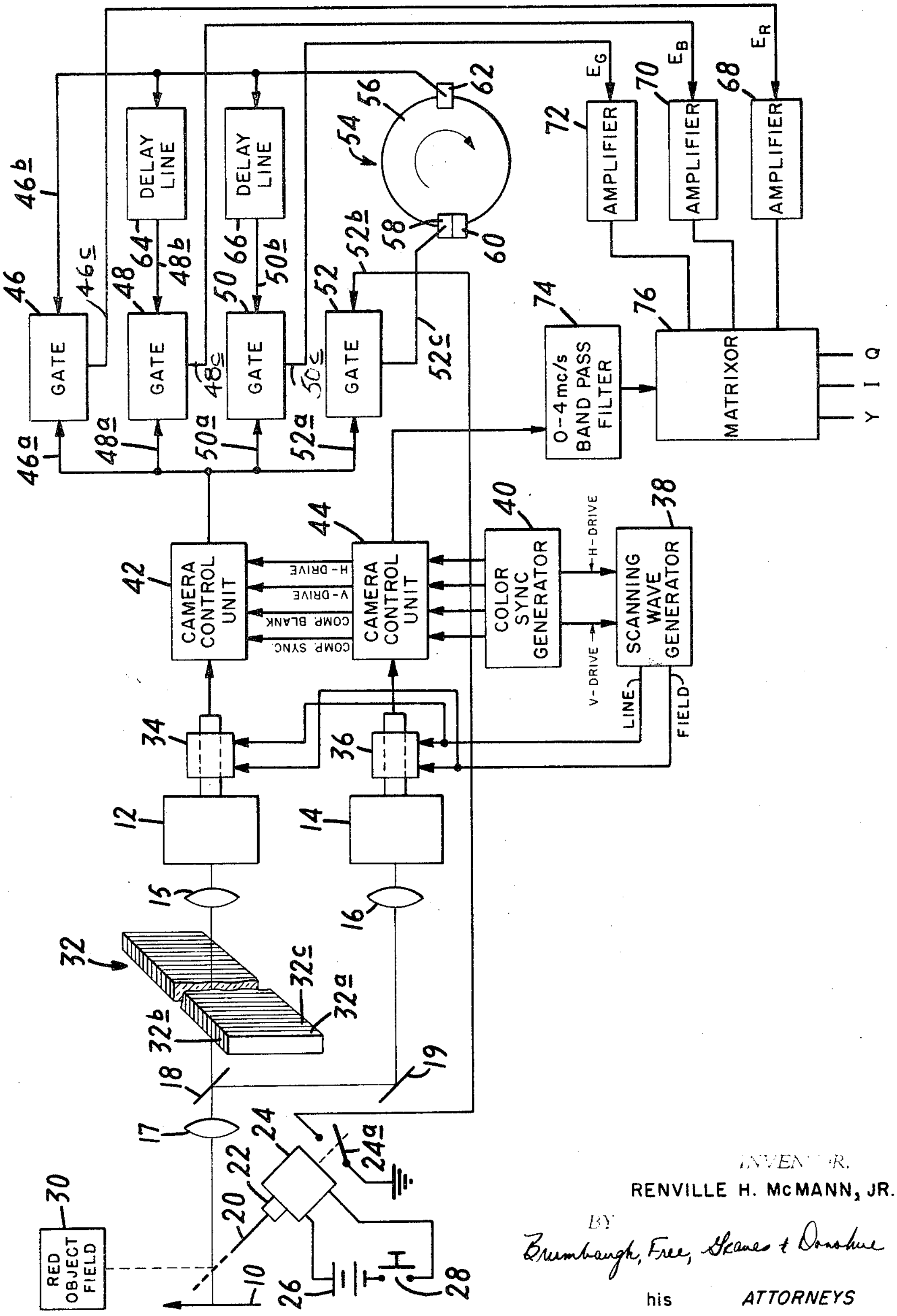
INVENTOR.
RENVILLE H. McMANN, JR.
BY
Brumbaugh, Free, Graves & Donohue
his ATTORNEYS 3,479,450
Patented Nov. 18, 1969

SAMPLING APPARATUS FOR TELEVISION SYSTEMS EMPLOYING ONE AND TWO PICK-UP TUBES

Renville H. McMann, Jr., New Canaan, Conn., assignor to Columbia Broadcasting System, Inc., New York, N.Y., a corporation of New York Filed Dec. 19, 1966, Ser. No. 602,907
Int. Cl. H04n 5/38, 5/44
U.S. Cl. 178—5.4 10 Claims

ABSTRACT OF THE DISCLOSURE

A system for pickup and transmission of simultaneous color television signals requiring only one camera tube for derivation of the color information signals is described. The object field being viewed is separated into its respective primary color components with a color strip filter interposed between the object field and the camera target. The filter consists for example, of a sequence of successive red, green, and blue filter strips arranged in a parallel manner and at right angles to the lines of the camera scanning raster. In operation, the signal output from the camera represents a sequential series of segments of the respective primary color components present in the object field. These color components are aligned in time to produce a simultaneous output by gating the components through the use of delay lines and a delay recording means. Detailed luminance information may be added by employing an additional camera tube to derive a luminance signal which is then combined with the primary color signals in a matrix.

This invention relates to color television apparatus, and, more particularly, to sampling apparatus for color television systems employing at least one scanning device to derive simultaneous color signals.

In an attempt to overcome the electrical and optical misregistration problems inherent in most conventional three pick-up tube color television systems, systems have been devised which employ one or two special pick-up tubes to derive simultaneous color signals. In systems employing a singular pick-tube, one signal is derived which contains separable portions corresponding to the three primary color components of the scanned object field and a further portion interspersed throughout the signal which operates as a reference level signal and enables the different color portions to be separated. In systems emloying two pick-up tubes, one pick-up tube is employed to derive a monochrome signal and another pick-up device is employed to derive a color signal containing separable color portions and reference portions interspersed throughout the color signal.

Systems of the above-mentioned type have not met with substantial commercial success inasmuch as the separable reference portions of the derived color signal have heretofore not been effectively employed to sample the color signal so as to effect the accurate separation of the separable color portions of the derived signal into simultaneous color signals. This has resulted in a color overlap, the commingling of the different primary color portions and the generation of distorted luminance and chrominance signals. Moreover, the inclusion of separable reference portions in the color signal necessarily reduces the effective bandwidths of the color portions of the color signal.

Accordingly, it is an object of the present invention to provide a simultaneous color television system employing at least one scanning device to derive simultaneous color signals which overcomes the abovementioned disadvantages of the prior art.

It is another object of the present invention to provide sampling apparatus for a color television system of the above-mentioned type which employs separable color component portions of a derived color signal to accurately sample the color signal so as to provide accurate color separation between the different portions of the signal.

These and other objects of the invention are accomplished by initially deriving at least one color television information signal containing separable portions, each separable portion corresponding to the same color component of an object field and thereafter deriving color television information signals, each signal containing separable portions which correspond to the different color components of another object field. The separable portions of the one color television information signal are recorded for a selected period of time, successively reproduced and further delayed for a selected period of time to thereby align in time each of the recorded portions with the separable portions of the subsequently derived color television information signals. The delayed portions of the one color television information signal and the separable portions of the subsequently derived color television information signals are supplied to a gate circuit which accurately separates the separable portions of the subsequently derived color television information signals and provides simultaneous signals, each signal corresponding to a different color component of the another object field.

In the preferred embodiment of the invention, a singular scanning device, together with suitable optical and filtering arrangements, is provided for initially deriving first and second color signals, each signal containing separable phase portions and each separable portion corresponding to the same color component of an object field, and thereafter deriving color video signals, each signal containing separable phase portions corresponding to the different primary color components of another object field. The means for recording the separable phase portions of the first and second color signals preferably comprises storage means, along with record and reproduce transducer means for storing the separable phase portions and successively reproducing the stored portions at selected time intervals to thereby align the stored portions with the separable phase portions of the subsequently derived color signals.

Further objects and advantages of the invention will be apparent from a reading of the following detailed description thereof, taken in conjunction with the accompanying drawing which is a schematic block diagram illustrating the arrangement of the embodiment of the invention.

In a representative color television system according to the present invention, as shown in the drawing, an object field 10 is scanned by a color television camera of the simultaneous type. As shown, the camera includes two scanning devices 12 and 14 of the vidicon type with cooperating relay lenses 15 and 16, respectively, which focus images onto the light sensitive surfaces of the scanning devices 12 and 14. Light from the object field 10 is first collected by another lens 17 and then directed along two separate paths by a conventional semi-reflecting mirror 18 and a conventional front surface mirror 19. The light transmitted by the mirror 18 and reflected by the mirror 19 contains equal amounts of the red, blue and green color components of the object field 10 and, accordingly, represents the brightness of the object field 10.

Further included in the optical arrangement shown in the drawing is a second front surface mirror 20 which is coupled to the plunger 22 of a conventional solenoid 24. The input terminals of the solenoid 24 are coupled to a battery 26 and to one terminal of a pushbutton switch 28. The solenoid 24 also includes an associated contact 24*a*, shown in its normally open position, which is actuated to a closed position whenever the solenoid 24 is energized. The depression, preferably momentary, of the pushbutton switch 28 electrically couples the battery 26 across the input terminals of the solenoid 24 and causes the solenoid to energize. Energization of the solenoid 24 causes the actuation of the contact 24*a* to its closed position and also causes the plunger 22 to extrude. The surface mirror 20 is urged upwardly by the extruding plunger until it is interposed in the light path between the object field 10 and the lens 17, thereby blocking the path of light from the object field 10 to the lens 17 but reflecting light from a red object field 30, of any simplified and conventional construction, along the same light path.

Interposed between the mirror 18 and the relay lens 15 is a color strip filter 32 which comprises a plurality of filter sets, each set consisting of successive red, blue and green vertical filter strips 32*a*, 32*b* and 32*c*, respectively. Preferably, the color strip filter 32 comprises a different primary color filter strip for each successive picture element in a scanning line and, accordingly, possesses approximately 150 filter sets. For a line scansion frequency of nominally 15,750 cycles per second, the time taken to scan each line completely is 1/15,750 seconds or 63.5 microseconds and the time taken to scan each picture element in a particular primary color is .141 microsecond. It is noticeable, therefore, that each .141 microsecond segment of a color video signal developed by the device 12 will contain information corresponding to a different primary color component of the object field 10.

When the front surface mirror 20 is interposed between the object field 10 and the lens 17 such that only light from the object field 30 is transmitted by the semi-reflecting mirror 18, every third .141 microsecond segment, occurring every .423 microsecond, of the video signal developed by the device 12 will contain red information, the spacing between the segments containing no information. As will be explained in detail hereinbelow, the pushbutton switch 28 is depressed at the start of the scanning cycle to implement the recordation of color video signals which contain information corresponding only to the red object field 30. After these signals are recorded, the pushbutton switch 28 is released to deenergize the solenoid 24. This, in turn, will result in the retraction of the plunger 22 and light from the object field 10 will be collected by the lens 17 instead of the light from the red object field 30.

After the appropriate filtering by the filter 32, the separated primary color component light of the object field 10 is then collected by the lens 15 and focused onto the light sensitive surface of the scanning device 12. The incident light corresponding to the brightness of the object field 10 is reflected by the mirror 19, collected by the lens 16 and focused onto the light sensitive surface of the scanning device 14. It is noticeable that when the front surface mirror 20 is interposed between the object field 10 and the lens 17, of only the separated red incident light of the object field 30 is focused onto the light sensitive surface of the device 12 whereas all the incident red image light of the object field 30 is focused onto the light sensitive surface of the scanning device 14.

The scanning beams and the tubes 12 and 14 are deflected in the line and field directions by suitable scanning yokes 34 and 36, respectively, energized simultaneously with suitable sawtooth field and line scanning waves generated by a scanning wave generator 38. A color synchronizing generator 40 generates the suitable vertical and horizontal drive pulses which are applied to the scanning wave generator 38 and to the camera control units 42 and 44 associated with the camera tubes 12 and 14, respectively. The relationship between the horizontal and vertical drive pulses is selected to yield a 525-line, double-interlaced picture in accordance with conventional television standards and, more particularly, a vertical drive frequency of nominally 60 cycles and a horizontal drive frequency of 15,750 cycles.

The synchronizing generator 40 also develops composite blanking and composite sync signals in the usual manner, the composite blanking and sync signals being applied to the camera control units 42 and 44, as indicated by the labelled lines. The camera control unit 42, in response to the signals generated by the synchronizing generator 40 and to the video signal produced by the camera 12, supplies a color field signal containing 262½ line portions, each line portion containing segments representative of successive .141 microsecond scans in the different primary color components of the object field 10. More particularly, during the first field scansion of the odd lines by the camera 12, line one of the derived color signal contains an initial .141 microsecond segment corresponding to the incident red image light transmitted by the strip 32*a*, a second .141 microsecond segment corresponding to the incident blue image light transmitted by the strip 32*b*, a third .141 microsecond segment corresponding to the incident green image light transmitted by the strip 32*c* and so on until 450 picture elements are successively scanned in a different primary color. The remaining odd lines similarly possess .141 microsecond segments, each successive segment representative of a different primary color component of the object field 10. During the next field scansion by the camera 12, the even lines are scanned and each even line contains .141 miscrosecond segments, each successive segment representative of a different primary color component of the object field 10.

When the solenoid 24 is actuated to cause the interposition of the mirror 20 between the object field 10 and the lens 17, each line of a color signal derived by the device 12 will contain spaced .141 microsecond segments corresponding to the incident red image light of the object field 30. This is true because the filter strips 32*b* and 32*c* are arranged to transmit only incident blue and green image light, respectively, and block any incident red image light. The camera control unit 44 in response to the signals generated by the generator 40 and the the video signal produced by the camera tube 14 supplies a monochrome signal representative of the brightness of the object field 10 or, in the alternative, supplies a signal representative of the red color information of the object field 30.

In accordance with the invention, the color signals thus developed by the camera control unit 42 are further combined with the proper line and field blanking signals and supplied to four parallel-connected gates 46, 48, 50 and 52 through their respective first input terminals 46*a*, 48*a*, 50*a* and 52*a*. The gates may be of a conventional type and accordingly in response to two or more signals of proper phase and amplitude applied to their respective input terminals pass signals representative of one of the applied input signals.

Coupled to the second input terminal 52*b* of the gate 52 is the normally open terminal of the contact 24*a* associated with the solenoid 24, the arm of the contact 24*a* being coupled to ground. The gate 52 is arranged so that it becomes operative whenever ground is coupled to the input terminal 52*b* and a signal of proper phase and amplitude is applied to the first input terminal 52*a*. It is obvious that the gate 52 may take on any simple and conventional arrangement which, when ground is applied to one input terminal, transmits the pulses applied to a second input terminal, such as, for example, a common base or common collector amplifier. The output terminal 52*c* of the gate 52 is coupled to a magnetic disc recorder 54. It is noteworthy that only the segments of the derived color signal corresponding to the scan of the all red object field 30 will be coupled from the gate 52 to the recorder 54. This is true inasmuch as the energized solenoid 24 controls the positioning of the surface mirror 20 and the actuation of the contact 24a so that the contact is closed only when the device 12 is scanning all red color images transmitted by the filter strips 32a of the filter 32.

Accordingly, when the device 12 is scanning only the transmitted red images of the object field 30, output signals occurring approximately every .423 microsecond or every time a complete filter set is scanned and having a pulse duration of .141 microsecond are supplied to the gate 52. In response to these red component signals and to the ground signal supplied to the terminal 52b, the gate 52 transmits the red component signals to the magnetic disc recorder 54 every .423 microsecond. As will be apparent hereinbelow, the red object field 30 is continually scanned to insure that only signals containing the proper amplitude and phase are stored on the magnetic disc recorder 54.

The magnetic disc recorder 54 is here shown as having a circular disc 56 which rotates adjacent to a suitably placed recording or write head 58, an erase head 60 adjacent the write head 58 and a reproducing or read 62 spaced 180° from a recording head 58. In the specific arrangement shown, the disc 56 of the recorder 54 is rotated in synchronism with the derived red color video signals so that 78,750 (150×525) red components segments of the color video signal, odd and even lines are recorded for each complete revolution of the disc, a synchronous motor (not shown) being used to drive the disc 56 so that the disc rotates in synchronism with the color video signals derived by the tube 12. It will be understood, however, that other rates of disc rotation not necessarily related to the video signal rate may be used provided that the spacing of the reproducing head 62 from the recording head 58 is properly selected.

While several different types of commercially obtainable storage devices may be used in the present invention, including for example magnetic tape systems, ultrasonic glass and quartz delay lines or magnetic film, a disc recorder is preferred. The disc, being rigid, can be easily synchronized with the video signals and the unit reproduces stored information with substantially no distortion. One commercially marketed video disc recorder which may be used in the instant invention is the MVR video disc recorder manufactured by Machtronics, Inc. which employs a metallic disc having a diameter of 14 inches, a maximum storage capacity of 1600 pictures and operates at a disc speed of 1800 r.p.m.

With the pushbutton switch 28 depressed and the surface mirror 20 interposed between the object field 10 and the lens 17, a detected red voltage signal, scanned in odd lines, is recorded on the rotating disc 56 through the recording head 58 and the appropriate recording electronics during the first one-half a complete revolution. More particularly, 39,375 segments, each segment having a pulse width of .141 microsecond, are stored at equidistant spacings of .282 microsecond on the disc 56. During the next one-half a complete revolution, the camera 12 scans the even lines of the all red object field 30 and 39,375 red component segments of the developed color signal are transmitted by the gate 52 and recorded at equidistant spacings on the disc 56 through the recording head 58 and the appropriate recording electronics. The reproducing head 62 is, as mentioned above, displaced 180° from the recording head 58 such that the recorded red component segments of the color signal, scanned in odd lines, are sensed by the reproducing head 62 and amplified by the appropriate reproducing electronics at exactly the same time that the recording head 58 is sensing and recording the red component segments of the derived color signal, scanned in even lines. The erase head 60 is supplied with magnetizing current from the recording electronics associated with the recording head 58 only when video information is being stored on the disc 56. Accordingly, as long as the red component signals corresponding to the all red object field 30 are transmitted by the gate 52 and recorded on the disc 56, the erase head 60 erases any prior information which had been stored on the track being recorded.

After two gated red color field signals, odd and even lines, are stored on the disc 56, and pushbutton switch 28 is released in order to deenergize the solenoid 24. With the deenergization of the solenoid 24, the plunger 22 is retracted, the gate 52 is disabled by the opening of the contact 24a and light from the object field 10 is collected by the lens 17. As mentioned above, the camera 12 will then develop color field signals, each signal containing .141 microsecond segments corresponding to the red, blue and green primary color components of the object field 10 and the camera 14 develops monochrome signals. It should be understood that it is not necessary to accurately control the energization of the solenoid 24, provided, of course, that the solenoid is energized for a period of time which will enable the recordation of two color signals, odd and even lines.

The recorded red color component signals are continually reproduced by the reproducing head 62, amplified by the reproducing electronics associated with the head 62 and applied to the second input terminal 46b of the gate 46 and to a pair of parallel-connected delay lines 64 and 66. The delay line 64 delays each recorded red component segment for a period of one picture element scan in a primary color or .141 microsecond and the delay line 66 delays each recorded red component segment for the period of two picture element scans in two primary colors or .282 microsecond.

Because the disc 56 is rotated in synchronization with the derived color video signals, the reproduced red component segments are aligned in time with the red component segments of the subsequently derived color video signals which represent the incident red image light of the object field 10. By further delaying the reproduced red component segments for .141 and .282 microseconds, there are produced at the output terminals of the delay lines 64 and 66 two signals which are aligned in time with the blue and green color component segments, respectively, of the subsequently derived color video signals. As shown, the output terminals of the delay lines 64 and 66 are coupled to the second input terminals 48b and 50b, respectively, of the gates 48 and 50. Accordingly, the red component segments supplied to the second input terminals of the gates 46, 48 and 50 are aligned in time with the red, blue and green components, respectively, of the subsequently derived color video signals. Furthermore, the red component segments are of proper phase and amplitude so as to enable the gates 46, 48 and 50 to successively transmit the red, blue and green segments, respectively, of the subsequently derived color video signals to thereby provide separated red, blue and green color signals $E_R$, $E_B$ and $E_G$, respectively.

Coupled to the output terminals 46c, 48c and 50c of the gates are a trio of amplifiers 68, 70 and 72, respectively, which amplify the sampled or gated primary color component segments of the subsequently derived color signals. Even though each successive picture element of a scanning line is discretely scanned in a different primary color, the amplified red, blue and green color signals alone do not contain sufficient information to reproduce satisfactory pictures in either color or black-and-white. Accordingly, the monochrome signal developed in the camera control unit 44 and corresponding to the brightness of the object field 10 supplies the required high resolution.

From the camera control unit 44 the monochrome signal, containing equal contributions from the red, blue and green color components of the object field 10, is passed through a 0–4.0 mc./s. bandpass filter 74. By passing the monochrome signal through the filter 74, unwanted high frequency noise and extraneous side bands are thereby eliminated. Thereafter, the filtered monochrome signal and the separately amplified red, blue and green color components segments of the color signal derived by the tube 12 are applied to the input terminals of a matrixor 76. In the matrixor 76, the red, blue and green color component segments are combined with monochrome signal, by appropriate addition and subtraction, to yield a luminance signal Y and chrominance signals I and Q in accordance with the NTSC standards.

In operation, the pushbutton switch 28 is depressed to thereby energize the solenoid 24 and implement the positioning of the mirror 20 between the object field 10 and the lens 17. The scanning device 12 together with the filter strips 32*a* of the filter 32 operates to derive color signals containing discrete .141 segments occurring every .423 microsecond, each segment representative of a .141 microsecond scan of the red object field 30. The discrete .141 microsecond segments are supplied through the gate 52 to the magnetic disc recorder 54 wherein the segments are recorded on the disc 56 at equidistant spacings of .282 microsecond. The pushbutton switch 28 is maintained in a depressed state until at least two fields, odd and even lines, of the red object field 30 are scanned by the scanning device 12. Thereafter, the pushbutton switch 28 is released and the scanning device 12, in conjunction with the filter strips 32*a*, 32*b* and 32*c* of the filter 32, operates to derive color video signals containing discrete segments, each segment representative of a successive .141 microsecond scan in the red, blue and green color components of the object field 10. The color signals are applied to the gates 46, 48 and 50 wherein the red, blue and green color components segments, respectively, are individually sampled by the recorded and time-delayed red component segments of the all red color signal. The sampled red, blue and green color component segments are then amplified by the amplifiers 68, 70 and 72, respectively, and supplied to the matrixor 76. The monochrome signals are, after the appropriate filtering by the filter 74, similarily supplied to the matrixor 76 wherein the signals are combined with the sampled red, blue and green color component segments to provide a lumiance signal Y and chrominance signals I and Q.

It will be understood that the invention is susceptible to considerable modification and not limited to the above described illustrative embodiment. For example, the red, blue or green color component segments of the derived color signal may be stored by the recorder 54 and employed to individually sample the color component segments of a subsequently derived color signal. Also, by changing the filtering and optical arrangement, the tube 12 may be employed to derive a color signal containing red and blue color component segments and the tube 14 may be employed to derive a color signal corresponding only to the incident green in which light line of the object field 10. Furthermore, each filter set of the filter 32 may include an additional black filter strip. For this type system, the portions of the video signal corresponding to the scanning of the black filter strip would be used to sample the primary color components of the subsequently derived color signals instead of the red primary color components. Accordingly, all such modifications and variations within the skill of the art are included within the spirit and intent of the invention as defined by the following claims.

I claim:

1. Apparatus for developing simultaneous color television signals comprising input means for deriving at least one color television information signal containing separable portions, each separable portion corresponding to the same color component of an object field, and for thereafter deriving color television information signals, each signal containing separable portions corresponding to the different primary color components of another object field, recording means for recording the separable portions of the one color television information signal for a selected period of time to thereby align in time each recorded portion with at least one of the separable portions of the subsequently derived color television information signals, delay means for selectively delaying the recorded portions to further align in time each recorded portion with at least one other of the separable portions of the subsequently derived color television information signals and gate means responsive to the recorded and the selectively delayed portions of the one color television information and to the subsequently derived color television information signals for separating the separable portions of the subsequently derived color television information signals to thereby provide simultaneous color signals corresponding to the different primary color components of the another object field.

2. Apparatus according to claim 1 wherein the input means further includes means for supplying a monochrome signal corresponding to the brightness of the another object field.

3. Apparatus according to claim 2 wherein the input means includes image scanning means for deriving at least one color information signal containing separable phase portions, each separable portion corresponding to the same color component of the object field and for thereafter deriving monochrome signals corresponding to the brightness of the object field and color television information signals containing successive separable phase portions, each successive portion corresponding to a different primary color component of the another object field.

4. Apparatus according to claim 3 wherein the recording means comprises storage means, recording transducer means for recording the separable phase portions of the one color television information signal on the storage means and reproducing transducer means for reproducing the recorded portions at selected time intervals.

5. Apparatus according to claim 4 wherein the storage means includes movable magnetic disc means and the recording transducer means and the reproducing transducer means include magnetic head means spaced along the magnetic disc means in proportion to the rate of motion of the magnetic disc means to thereby align in time the recorded phase portions of the one color television information signal with one of the separable portions of the subsequently derived color television information signals.

6. Apparatus according to claim 5 wherein the image scanning means includes means for developing at least two color television information signals containing separable phase portions, each portion corresponding to the same color component of the object field, and wherein the recording means includes means for recording the separable portions of the two derived color television signals on the storage means to thereby align recorded portions of each color television signal with one of the separable portions of every other subsequently derived color television signal.

7. Apparatus according to claim 6 wherein the delay means includes delay line means responsive to the recorded portions of the two color television signals for selectively delaying the portions to thereby align in time the portions of each signal with the separable portions of every other subsequently derived color television signal corresponding to different primary color components of the another object field.

8. Apparatus according to claim 7 wherein the delay line means includes two delay lines for respectively delaying the recorded portions for the time it takes the image scanning means to scan one picture element of a scanning line in one primary color and for the time it takes the image scanning means to scan two picture elements of a scanning line in two primary colors.

9. Apparatus according to claim 8 wherein the gate means includes three gate circuits responsive to the subsequently derived color television signals and to the recorded and selectively delayed portions of the two color television information signals for separating the separable portions of the subsequently derived color television information signals.

10. Apparatus according to claim 9 further including combining means responsive to the monochrome signal and to the simultaneous color signals for combining the monochrome signal with the simultaneous color signals to thereby provide luminance and chrominance signals.

References Cited

UNITED STATES PATENTS

| | | | |
|---|---|---|---|
| 3,001,012 | 9/1961 | Braicks | 178—5.4 |
| 3,267,207 | 8/1966 | Okazaki et al. | 178—5.2 |

ROBERT L. GRIFFIN, Primary Examiner

ROBERT L. RICHARDSON, Assistant Examiner